United States Patent
Pomara, Jr.

[15] 3,674,178
[45] July 4, 1972

[54] APPARATUS FOR MEASURING AND DISPENSING PARTICULATE MATERIAL

[72] Inventor: Johnny B. Pomara, Jr., 1925 Valley View Lane, Dallas, Tex. 75235

[22] Filed: Dec. 17, 1969

[21] Appl. No.: 885,872

[52] U.S. Cl..............................222/56, 222/161, 222/235, 222/308, 141/160
[51] Int. Cl...........................................B67d 5/08
[58] Field of Search.................222/438, 440, 161, 254, 235, 222/236, 308, 1, 56; 141/159, 160; 198/76

[56] References Cited

UNITED STATES PATENTS

| | | | |
|---|---|---|---|
| 3,165,237 | 1/1965 | Stevens | 222/254 X |
| 3,146,915 | 9/1964 | Gregor | 222/161 |
| 1,601,862 | 10/1926 | Legg et al. | 222/235 |
| 2,587,338 | 2/1952 | Lee et al. | 222/440 |
| 1,785,945 | 12/1930 | Ezdorf et al. | 222/236 |
| 3,351,245 | 11/1967 | Johnson | 222/308 |
| 2,618,395 | 11/1952 | De Brabander | 222/56 |
| 1,175,190 | 3/1916 | Stuart | 198/76 |

*Primary Examiner*—Robert B. Reeves
*Assistant Examiner*—John P. Shannon, Jr.
*Attorney*—Howard E. Moore and Gerald G. Crutsinger

[57] ABSTRACT

Apparatus for measuring and dispensing moistened or dry particulate material, such as rice or grated cheese, comprising a storage container having an agitator therein for dispensing and uniformly spreading particles of material on a conveyor which feeds the material into a measuring and dispensing device. The measuring and dispensing device comprises a container having an inclined bottom with an agitator disposed therein and a vibrator connected thereto to allow unpacked particles to be measured and dispensed into receptacles in food trays. The apparatus which measures and dispenses the material comprises a slide having a measuring compartment with a variable volume which moves under the container for filling and then over a hollow dispensing spout which is congruent with the receptacle in the tray to fill the receptacle.

25 Claims, 11 Drawing Figures

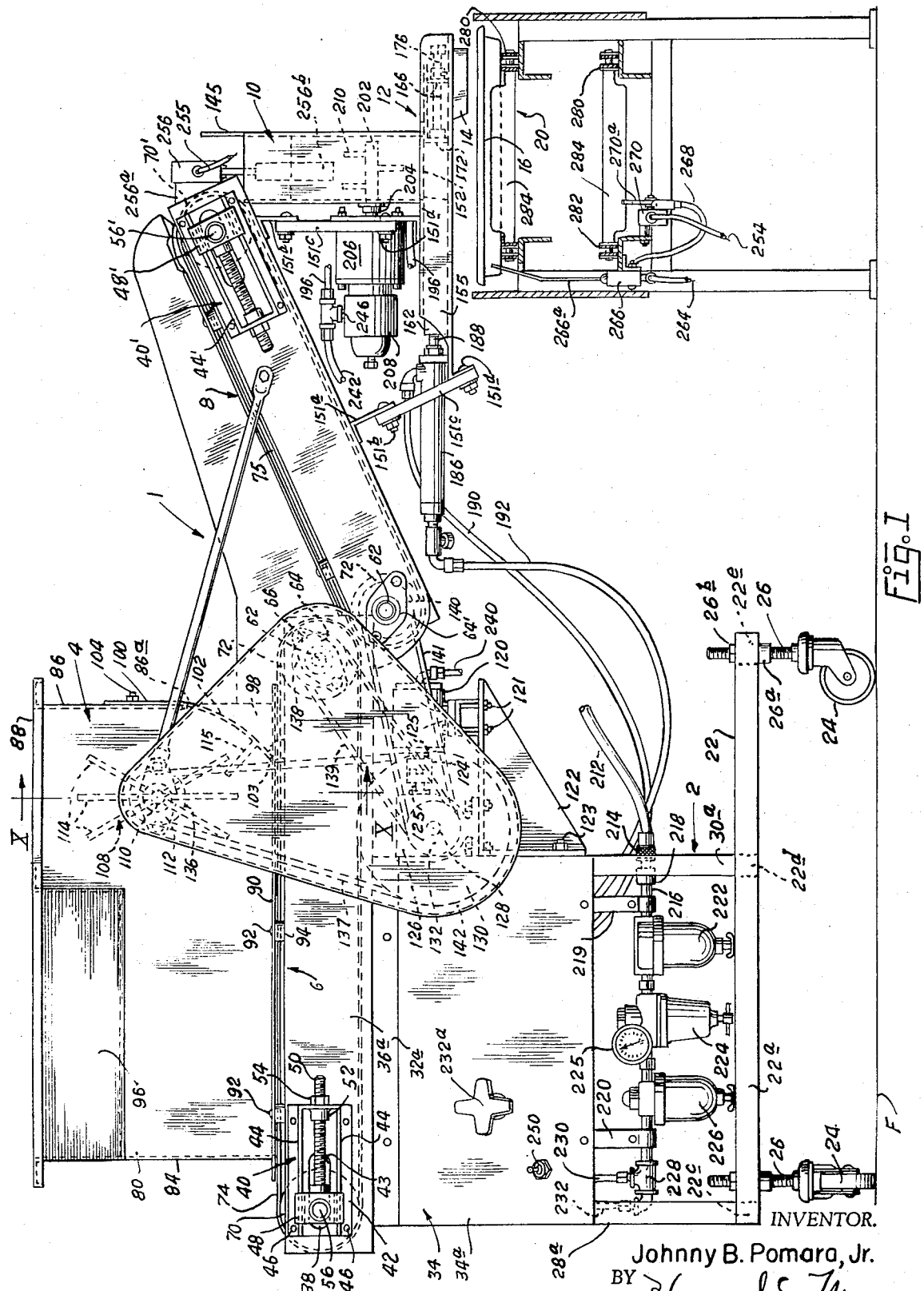

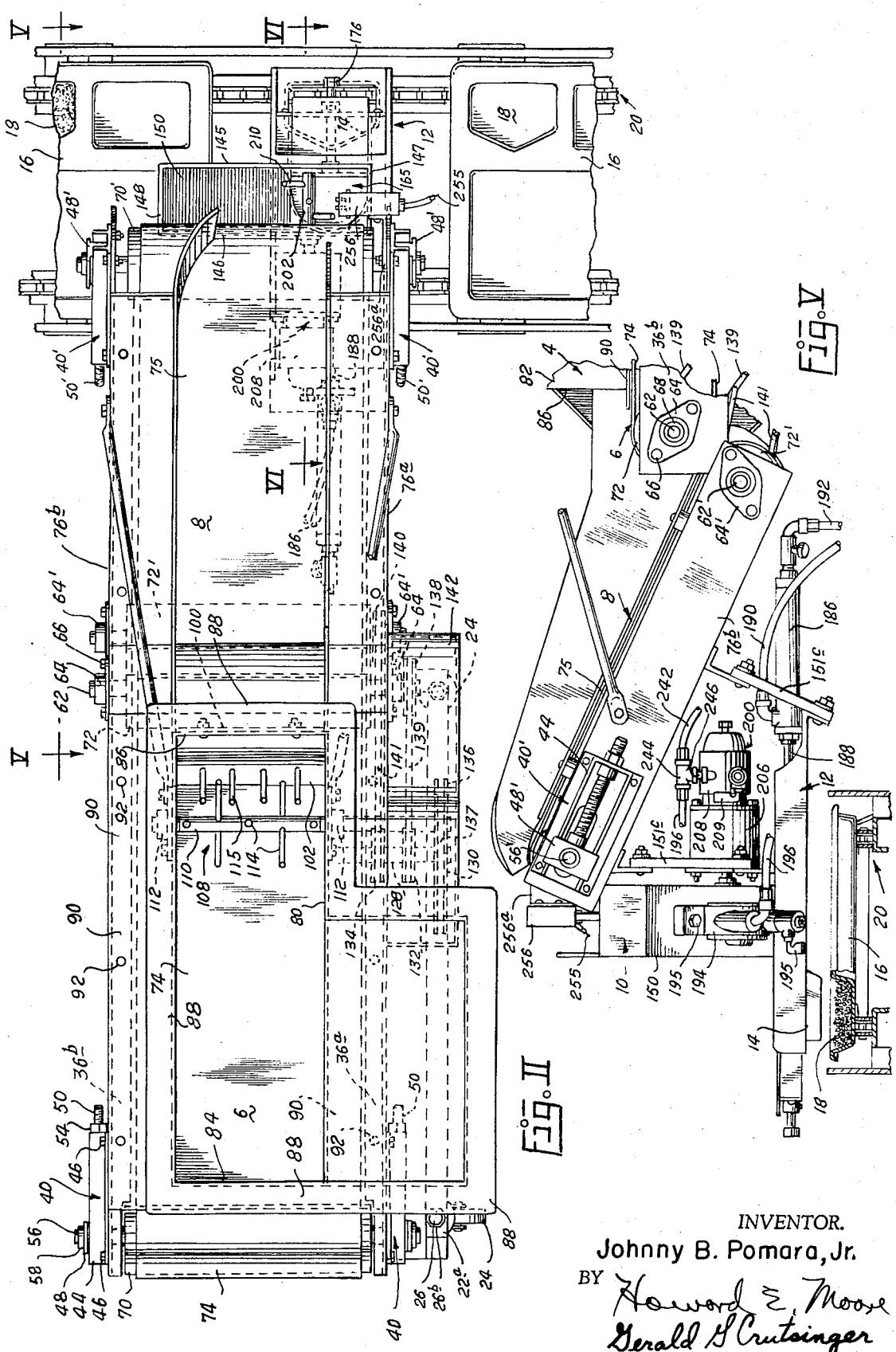

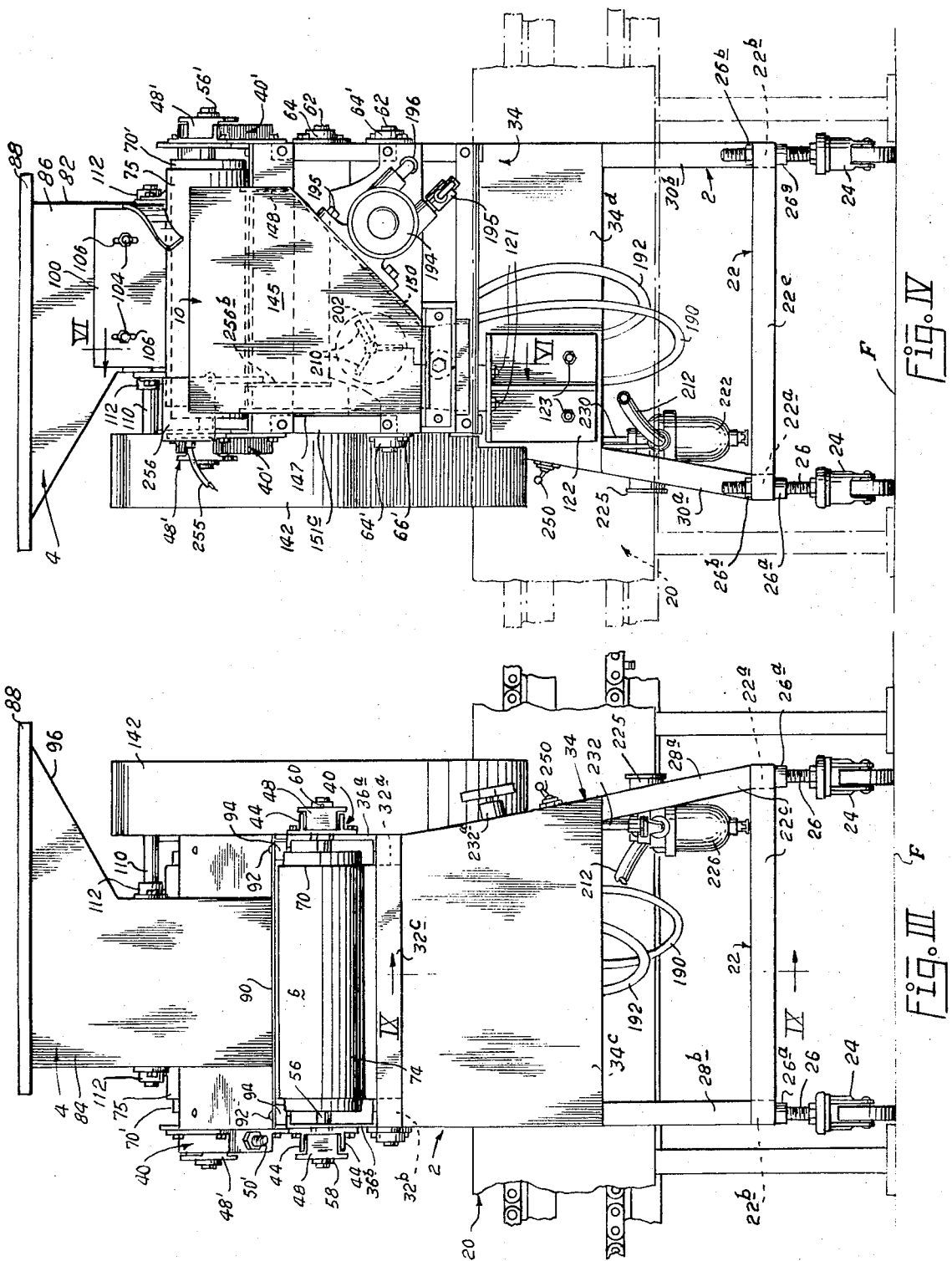

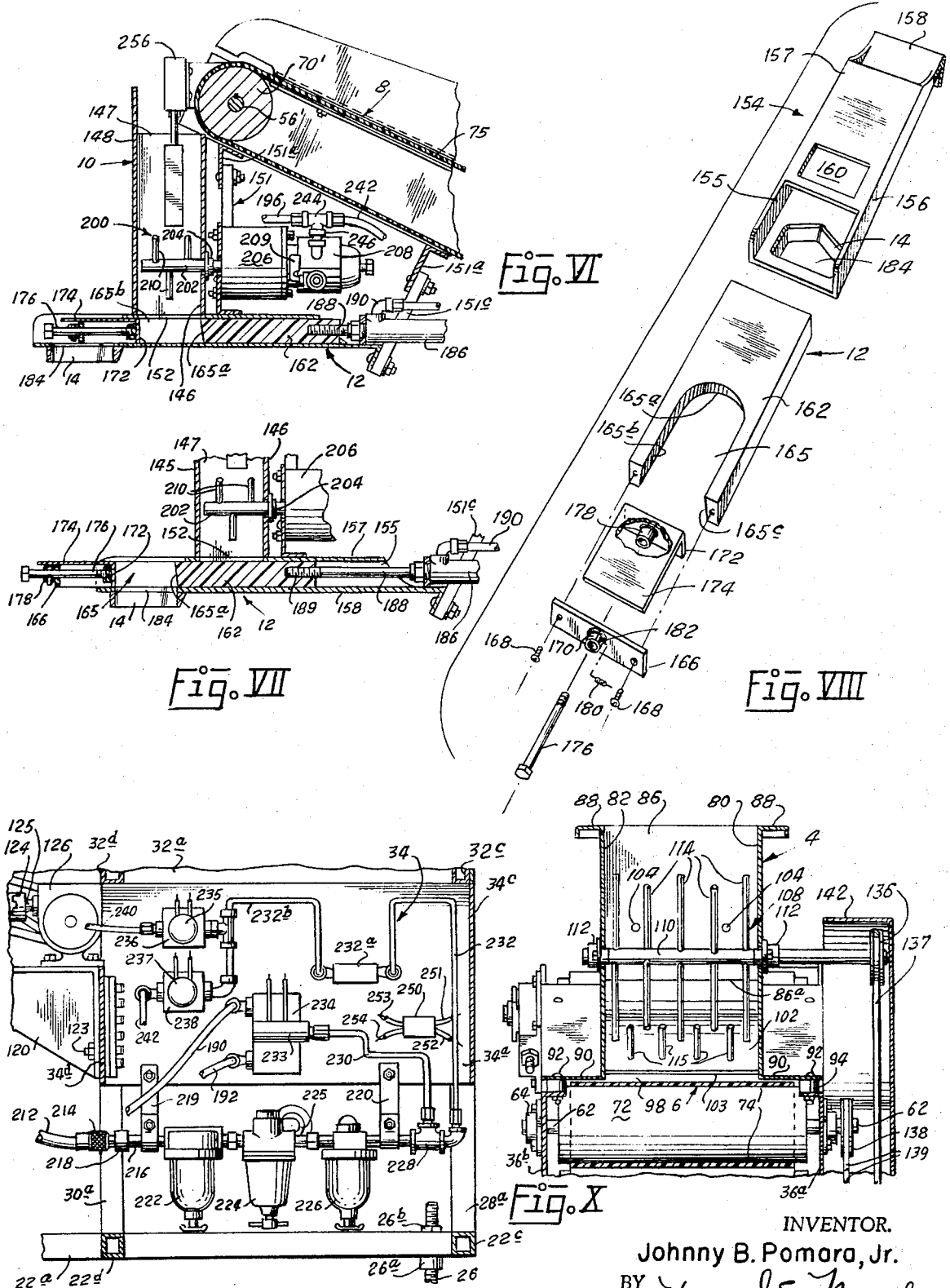

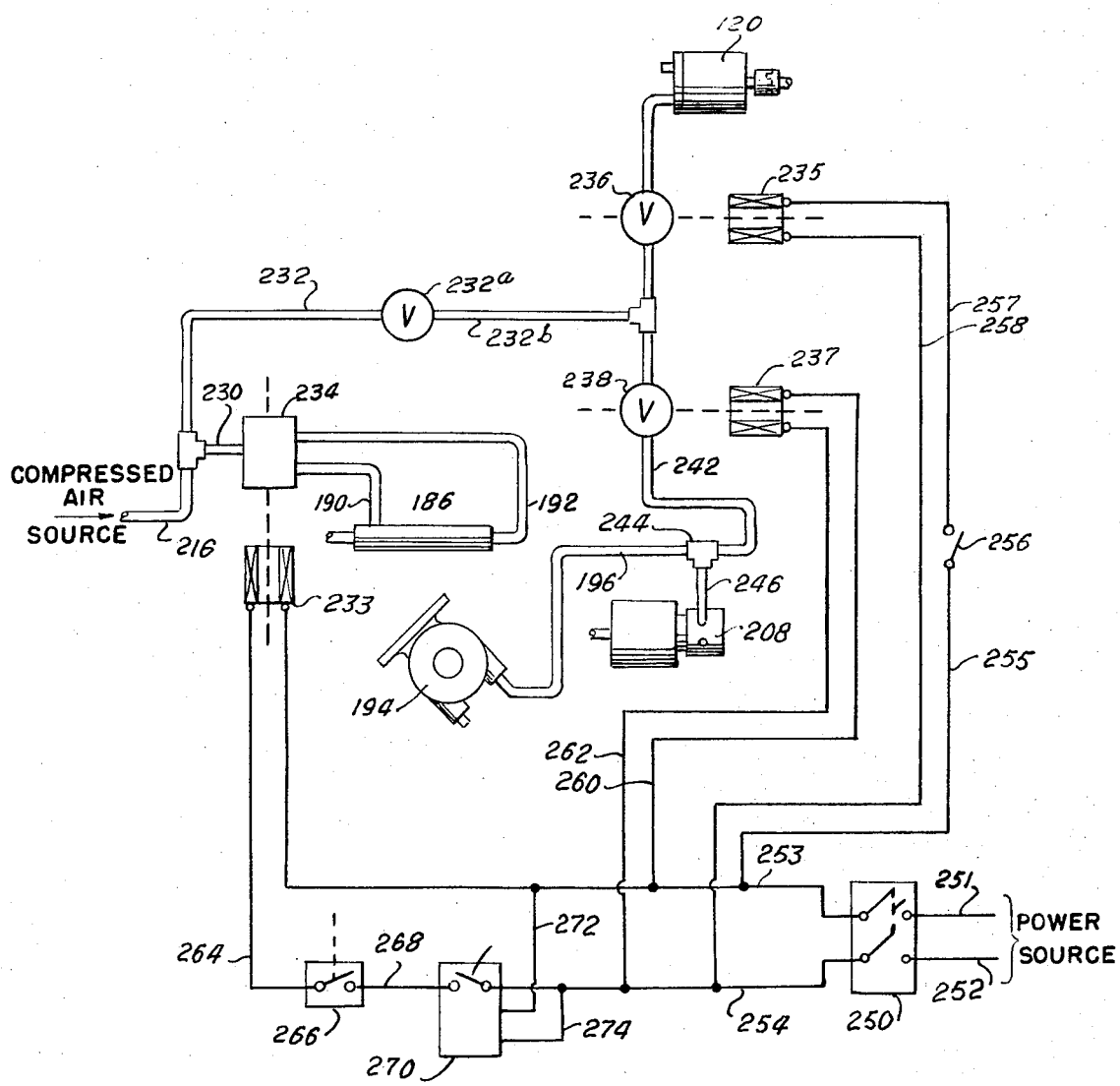
Fig. XI

APPARATUS FOR MEASURING AND DISPENSING PARTICULATE MATERIAL

BACKGROUND OF INVENTION

Heretofore measuring and dispensing devices for moistened particulate material, such as food materials and more particularly cooked rice, have been unsuccessful. Materials comprising particles, which tend to stick together, are relatively difficult to dispense from automatic machines and have normally required manual operations which are expensive.

Packaged frozen dinners often do not contain certain foods because the consumer would refuse to pay for the cost of handling and packaging even though the food material is inexpensive.

SUMMARY OF INVENTION

I have developed a method and apparatus for effectively handling, measuring and dispensing moistened particulate materials.

A relatively large volume of material is placed in a storage vessel where an agitator maintains the particles in a loose condition allowing them to be dispensed onto a first conveyor in relatively dense sheet. The relatively dense sheet is passed to a second conveyor, traveling at a speed greater than that of the first conveyor, where it is broken down to form a less dense sheet of individual particles, the particles being disconnected, leaving the material substantially free of lumps.

The second conveyor feeds the particles of material to a container in regulated quantities.

Sensing means in the container controls movement of the first and second conveyors, stopping said conveyors when a predetermined amount of material has been deposited in the container.

An agitator in the container maintains the particles of material in a loose condition to prevent lumping and to urge material into a measuring compartment. The bottom of the receptacle is inclined to direct the material toward an opening in a lower portion of the container which feeds into a slide having a measuring compartment, the volume of which may be regulated. When a tray is in position to receive the material, switching devices cause a measured volume of material to be dispensed into a receptacle in the tray.

A vibrator on the container shakes the particulate material toward the opening and minimizes the tendency of the particles to stick to the sides of the container.

A primary object of the present invention is to provide measuring and dispensing apparatus for moistened particulate material capable of separating a mass of material to form particles allowing accurate measuring and dispensing of the material into receptacles.

Another object of the invention is to provide apparatus for measuring and dispensing moistened particulate material which is automated to minimize human handling.

A further object of the invention is to provide apparatus for measuring and dispensing particulate material which intermittently dispenses measured quantities of material into receptacles in rapidly moving containers.

A further object of the invention is to provide apparatus for measuring and dispensing moistened particulate material of simple construction which may be operated by unskilled workmen.

A still further object of the invention is to provide apparatus for measuring and dispensing moistened particulate material which may be easily cleaned and sterilized.

A still further object of the invention is to provide a method of measuring and dispensing moistened particulate material wherein the particles of material are separated to eliminate lumps and then recombined in small quantities for accurate measuring and dispensing.

Other and further objects of the invention will become apparent upon referring to the detailed description hereinafter following and to the drawings annexed hereto.

DESCRIPTION OF THE DRAWING

Drawings of a preferred embodiment of the invention are annexed hereto so that the invention may be better and more fully understood, in which:

FIG. I is a side elevational view;
FIG. II is a top plan view;
FIG. III is a rear elevational view;
FIG. IV is a front elevational view;
FIG. V is a fragmentary elevational view looking in the direction of the arrows at line V—V of FIG. II;
FIG. VI is a cross-sectional view taken substantially along line VI—VI of FIG. II;
FIG.. VII is a fragmentary cross-sectional view similar to FIG. VI with the slide in the dispensing position;
FIG. VIII is an exploded perspective view of the slide assembly;
FIG. IX is a cross-sectional view taken along line IX—IX of FIG. III;
FIG. X is a cross-sectional view taken along line X—X of FIG. I; and
FIG. XI is a wiring diagram of the control circuit.

Numeral references are employed to designate parts throughout the various figures of the drawing and like numerals designate like parts throughout the various figures of the drawing.

DESCRIPTION OF A PREFERRED EMBODIMENT

Referring to FIG. I of the drawing, the numeral 1 generally designates a measuring and dispensing device supported by a general frame 2, said device comprising a storage vessel 4 from which particulate material is fed by first conveyor 6 and second conveyor 8 to a container 10. Measuring apparatus comprising a slide assembly 12 is employed for dispensing measured quantities of particulate material through dispensing spout 14 into a receptacle in tray 16 carried on conveyor 20.

The frame, generally designated by the numeral 2, comprises longitudinally extending members 22a and 22b welded or otherwise rigidly secured to transverse members 22c, 22d and 22e forming a substantially rectangular base 22. Casters 24 are secured through suitable leveling means, such as threaded shank 26, to base 22 of frame 2 to provide means for moving frame 2 vertically and horizontally relative to a supporting surface or floor F. Threaded shanks 26 are threadedly secured in receptacles 26a which are rigidly secured adjacent each corner of the base 22. Lock nuts 26b are employed to disengageably secure threaded shanks 26 relative to base member 22.

Upwardly extending members 28a and 28b have their lower ends welded or otherwise rigidly secured to the rear ends of longitudinal members 22a and 22b. Upwardly extending members 30a and 30b have their lower ends welded or otherwise rigidly secured to intermediate portions of longitudinally extending members 22a and 22b adjacent opposite ends of transversely extending member 22d. Upper longitudinally extending members 32a and 32b are welded or otherwise rigidly secured to the upper ends of upwardly extending members 28a and 30a, and 28b and 30b, respectively. Upper transverse members 32c and 32d are welded or otherwise rigidly secured in spaced apart relation to the upper longitudinal members 32a and 32b.

Skirts 34a, 34b, 34c, and 34d are bolted or otherwise secured to upwardly extending members 28a, 28b, 30a and 30b to form a cabinet 34 in which suitable control devices are mounted as will be hereinafter more fully explained.

Channel members 36a and 36b are secured to upper longitudinal extending members 32a and 32b, said channel members being adapted to support the first conveyor 6 and storage vessel 4 as will be hereinafter more fully explained.

Channel members 36a and 36b have elongated openings 38 extending therethrough about which suitable means to regulate the tension in conveyor 6 is mounted. Bracket 40 comprises a mounting plate 42, having an opening 43 extending therethrough in overlying relation with opening 38 through channel members 36a and 36b, and guide rails 44. The brackets 40 are secured to channel members 36a and 36b by suitable means such as bolts 46.

A bearing block 48 is slidably disposed on guide rails 44 and a shank 50 connected to bearing block 48 is threadedly secured in a collar 52 which is rigidly secured to bracket 40. From the foregoing it should be readily apparent that rotation of threaded shank 50 causes bearing block 48 to move longitudinally along guide rails 44. A lock nut 54 is employed to secure threaded shank 50 relative to bearing block 48.

Axle 56 is rotatably journaled in bearing block 48 and suitable means, such as collars 58 secured to opposite ends of axle 56 by set screws 60, prevents longitudinal movement of said axle relative to bearing blocks 48.

Axle 62 extends through openings in channel members 32a and 32b and is rotatably journaled in bearings 64 secured to said channel members by bolts 66. Collars 68 are secured to opposite ends of axle 62 to prevent longitudinal movement of said axle relative to bearing blocks 64.

Rollers 70 and 72 are rigidly secured to axles 56 and 62, said rollers frictionally engaging conveyor belt 74.

From the foregoing it should be readily apparent that the first conveyor generally designated by the numeral 6 comprises axles 56 and 62, rollers 70 and 72, and conveyor belt 74. Bracket 40 and movable bearing block 48 constitute means for adjusting the tension of first conveyor 6.

The second conveyor 8, carried by elongated members 76a and 76b, is of substantially identical construction to the first conveyor 6 hereinbefore described. Brackets 40' secured to members 76a and 76b support movable bearing block 48' which has an axle 56' rotatably journaled therein. Axle 62' is rotatably journaled in bearings 64', said bearings being secured to members 76a and 76b in spaced apart relation from bearing blocks 48'. Rollers 70' and 72' are rigidly secured to axles 56' and 62', respectively and frictionally engage conveyor belt 75.

Since the second conveyor 8 is substantially identical to the first conveyor 6, parts of the second conveyor 8 are designated by primed numerals corresponding to the numerals employed to designate like parts of the first conveyor 6.

Storage vessel 4 comprises spaced sides 80 and 82 rigidly connected to transversely extending end walls 84 and 86. An upper flange 88 is connected to and encircles the upper edge of storage vessel 4.

A flange 90 extends outwardly from sides 80 and 82 and end wall 84 of the storage vessel 4 and is connected by bolts 92 and spacers 94 to the upper flange of channel members 36a and 36b.

Referring to FIG. I of the drawing, it should be noted that storage vessel 4 is positioned vertically over first conveyor 6 and that flange 90 around the lower edge of storage vessel 4 is maintained in slightly spaced apart relation from conveyor belt 74 by spacers 94 allowing conveyor belt 74 to move relative to the storage vessel 4 which has an open bottom.

The lower edge 86a of front end wall 86 (FIGS. I and X) terminates above the lower edge of storage vessel 4 forming an outlet passage 98 in the front end of the storage vessel 4.

Suitable means is provided for varying the size of opening 98, such as plate 100 having a curved end portion 102. Bolts 104 extend through elongated slots 106 in plate 100 to provide means for regulating the distance between the lower edge 103 of plate 100 and the upper surface of conveyor belt 74 for gauging the thickness of a sheet of material which may pass through outlet passage 98.

Agitator means 108 is provided to prevent compaction of particulate material adjacent the outlet passage 98 of storage vessel 4. The agitator means comprises a shaft 110 which extends through openings in sides 80 and 82 of storage vessel 4, said shaft being rotatably journaled in bearings 112 secured to the sides of the storage vessel. Projections, such as bars 114, are rigidly secured in spaced apart relation along a portion of the length of shaft 110 and are arranged to move through particulate material in the storage vessel 4 when shaft 110 is rotated. Projections, such as bars 115, are fixedly secured in spaced apart relation to the lower portion 102 of plate 100 and are arranged to extend between projections 114 as shaft 110 is rotated.

Drive means is operably connected to axles 62 and 62' and to shaft 110.

In the embodiment of the invention illustrated in the drawing, the drive means (FIGS. I and IV) comprises a motor 120 which is secured by bolts 121 to bracket 122 attached to the skirt 34d of frame 2 by bolts 123. Drive shaft of motor 120 is connected through a suitable clutch 124 to the input shaft 125 of a gear box 126. Pulleys 130, 132 and 134 are secured to output shaft 128 of gear box 126, best illustrated in FIG. II.

Shaft 110 of agitator 108 in supply vessel 4 has a pulley 136 secured thereto. Belt 137 extends around pulleys 130 and 136 to transmit rotative power from shaft 128 of gear box 126 to shaft 110 of agitator 108.

Axle 62 of first conveyor 6 has a pulley 138 rigidly secured to one end thereof. A belt 139 extends around pulleys 132 and 138 to impart rotation from output shaft 128 of gear box 126 to axle 62 for rotating the first conveyor 6.

Axle 62' of the second conveyor 8 has a pulley 140 rigidly secured thereto driven by belt 141 which extends around pulleys 134 and 140.

As hereinbefore pointed out the spacing between the lower edge 103 of plate 100 and the surface of conveyor belt 74 of the first conveyor 6 determines the thickness of a sheet of particulate material dispensed through outlet passage 98 of storage vessel 4 as conveyor belt 74 rotates. The sheet of particulate material is dispensed from conveyor belt 74 of the first conveyor onto the conveyor belt 75 of the second conveyor 8. Preferably conveyor belt 75 travels at a speed greater than that of conveyor belt 74 to transform the relatively dense sheet of particulate material dispensed from conveyor 6 into a less dense sheet on the second conveyor 8.

The desired speed ratio between the first conveyor 6 and the second conveyor 8 may be obtained by selecting pulleys 132, 134, 138 and 140 of desired diameters which will provide the desired differential speed. For example, if pulleys 132 and 134 are of equal diameter, pulley 140 would be smaller in diameter than pulley 138.

It should be appreciated that transmission means such as gears, chains and sprockets, or flexible cables may be employed in lieu of belts and pulleys for driving axles 62 and 62' and shaft 110 without departing from the basic concept of my invention.

The suitable cover 142 is employed to enclose pulleys 130, 132, 134, 136 and 138.

The container (FIG. IV) generally designated by the numeral 10 comprises spaced side walls 145 and 146 connected by end walls 147 and 148. Container 10 has an inclined bottom 150 which extends downwardly from the lower end of end wall 148.

The lower end of inclined bottom 150 is disposed in spaced apart relation from end wall 147 of container 10 such that an outlet passage 152 is defined by the lower edges of side 145, inclined bottom 150, side 146, and end wall 147.

A slide assembly generally designated by the numeral 12 is secured to the lower end of container 10 and extends across outlet passage 152 in the bottom thereof. Referring to FIGS. VI–VIII of the drawing, slide assembly 12 comprises a tubular member 154 having sides 155 and 156 connected by a top 157 and a bottom 158. The top 157 of tubular member 154 has an inlet opening 160 of substantially the same size and the same shape as outlet passage 152 in the bottom of container 10.

A slide comprising elongated member 162 having a measuring compartment 165 formed therein has a plate 166 secured to the end thereof by screws 168. Plate 166 has an opening in the central portion thereof about which a collar 170 is welded or otherwise rigidly secured.

An elongated slot is formed in member 162 one end of said slot being open. A movable wall 172 extends across the open end of the slot to form measuring compartment 165. A plate 174 is secured to the upper end of movable wall 172 and extends outward thereof. Rod 176 is threadedly secured in a collar 178 which is welded or otherwise rigidly secured to movable wall 172. A set screw 180 is threadedly secured in an aperture 182 in collar 170 and rod 176 is slidably disposed in collar 170 so that movable wall 172 may be moved relative to the plate 160 which is secured to the elongated member 162. Set screw 180 detachably secures the rod 176 and movable wall 172 relative to the elongated member 162.

The bottom 158 of tubular member 154 has an opening 184 extending therethrough and spout 14 is secured about said opening.

The outlet opening of spout 14 is preferably substantially the same size and shape as receptacle 18 in tray 16 into which particulate material is to be dispensed.

It should be noted that the elongated opening 165 constitutes a measuring compartment and that the inner wall 165a is curved and inclined. Side walls 165b, 165c of measuring chamber 165 are also inclined. The downwardly diverging walls 165a, b and c provides a measuring compartment which has a cross-sectional area at the upper end which is smaller than the cross-sectional area of the lower end. Provision of a measuring compartment having cross-sectional areas progressively increasing through the depth of a compartment causes moist particulate material to be dispensed therefrom by gravity more readily than from a measuring compartment having vertical sides.

The elongated member 162 having measuring compartment 165 formed therein is preferably constructed of a material such as plastic which has a smooth surface to prevent sticking of moist particulate material thereto. High density polyethylene material, among others, provides the desired characteristics.

Referring to FIGS. VI and VII of the drawing, slide assembly 12 is positioned such that the outlet passage 152 in container 10 is positioned in overlying relation with inlet opening 160 in tubular member 154.

Suitable means is provided for moving the elongated member 162 longitudinally through tubular member 154 from a first position, illustrated in FIG. VI, wherein the measuring compartment 165 is positioned adjacent inlet opening 160 and to a second position, illustrated in FIG. VII, wherein the inlet opening 160 is closed and the measuring compartment 165 is positioned adjacent outlet opening 184.

Suitable means for moving elongated member 162 comprises a fluid actuated cylinder 186 having a piston rod 188 secured to a piston (not shown) slidably disposed in cylinder 186. The outer end of piston rod 188 is secured by suitable means, such as threads 189 to the elongated member 162. Suitable means including conduits 190 and 192, is provided to selectively provide pressurized fluid to the opposite sides of the piston to cause piston rod 188 to be extended and retracted as will be hereinafter more fully explained.

As best illustrated in FIGS. I and IV of the drawing, deformable support means 151 comprising, anchor members 151a, welded or otherwise rigidly secured relative to the frame 2; connectors, such as threaded bolts 151b; and a resilient elongated member such as a rubber strap 151c, is secured by a suitable connector such as threaded bolt 151d to the slide assembly 12 which supports container 10 as hereinbefore described.

A conventional fluid actuated vibrator 194 (FIGS. IV and V) is secured to container 10 by bolts 195 which threadedly engage the inclined bottom 150 of the container 10. Suitable means including a conduit 196 in fluid communication with the inside of vibrator 194 selectively provides pressurized fluid to the vibrator to shake container 10 as will be hereinafter more fully explained.

Agitator means 200, best illustrated in FIGS. I and V, is provided to prevent compaction of particulate material in container 10. Agitator 200 comprises a shaft 202 which extends through the wall 146 of container 10, said shaft being rotatably journaled in a bearing 204 and operably connected to suitable means for rotating said shaft, such as clutch 206 and motor 208. Protrusions, such as bars 210, extend outwardly in spaced apart relation along the length of shaft 202 such that the protrusions agitate particulate material as shaft 202 is rotated.

Suitable means is provided for energizing conveyor motor 120, vibrator 194, and agitator motor 208. In the particular embodiment of the invention illustrated in the drawings motor 120, motor 208 and vibrator 194 are fluid actuated. Suitable means for actuating the fluid operated devices is illustrated in FIG. IX of the drawing. Flexible hose 212 is connectable to a suitable source of pressurized fluid, such as an air compressor (not shown) and has a conventional quick connect coupling 214 for securing the hose 212 to a conduit 216. Suitable support means such as brackets 218, 219 and 220 are provided for securing conduit 216 to the frame 2.

Conduit 216 has suitable control devices disposed therein, such as lubricating apparatus 222, regulator 224, pressure gauge 225, and water filter 226. Other control devices may be employed in conduit 216 if it is deemed expedient to do so.

Conduit 216 is connected through a suitable coupling, such as tee 228, to conduits 230 and 232.

Pressurized fluid in conduit 230 is delivered to a conventional four-way solenoid actuated valve 234 having ports connectable to conduits 190 and 192 which communicate with the inside of cylinder 168 on opposite sides of the piston slidably disposed therein to extend and retract piston rod 188 secured to elongated member 162 of the slide assembly 12.

Pressurized fluid through conduit 232 is delivered through control valve 232a and conduit 232b to solenoid actuated valves 236 and 238.

Valve 236 is connected through conduit 240 to the conveyor motor 120.

Valve 238 is connected through conduit 242 to a suitable coupling, such as tee 244 (FIG. VI) which is connected through conduit 196 to vibrator 194 and through conduit 246 to the inlet opening of the fluid actuated agitator motor 208.

As best illustrated in FIG. IV vibrator 194 has means, such as valve 195 connected to the outlet opening for regulating the flow rate of fluid therethrough.

Agitator motor 208 has a valve 209 in the outlet passage thereof for controlling the flow rate of pressurized fluid therethrough.

An electric control system is schematically illustrated in FIG. XI of the drawing which provides electrical current for energizing solenoid actuated valves 234, 236 and 238. An on-off switch 250 is connected to a suitable source of electric current (not illustrated) through conduits 251 and 252.

Coil 233, adapted to actuate valve 234, coil 235, adapted to actuate valve 236, and coil 237, adapted to actuate valve 238, are electrically connected in parallel to lines 253 and 254 which are electrically connected to on-off switch 250.

Line 255 extends between line 253 and switch 256 which is connected through line 257 to one side of the coil 235 of solenoid actuated valve 236. The other side of coil 235 is connected through conductor 258 to line 254.

Line 253 is connected through conductor 260 to one side of coil 237 of solenoid actuated valve 238 and the other side of said coil is connected through conductor 262 to conductor 254.

One end of the coil 233 of solenoid actuated valve 234 is connected to line 253 and the other end of said coil is connected through conductor 264 to a switch 266 which is connected in series through conductor 268 to a time delay relay 270. The time delay relay 270 is connected to line 254. The timing mechanism of time delay relay 270 is connected through conductors 272 and 274 to lines 253 and 254, respectively.

As best illustrated in FIGS. II, IV and V, switch 256 is secured by a bracket 256a to member 76 which supports the second conveyor 8 on the frame 2. Switch 256 has an actuating arm 256b which extends into container 10. Switch 256 is normally closed, said switch being opened by particulate material as the upper surface of said material rises to a predetermined level thereby de-energizing solenoid 235 causing valve 236 to be closed which in turn de-energizes conveyor motor 120.

As best illustrated in FIG. I conveyor 20 carrying trays 16 comprises endless flexible drive members 280 and 282 having spacers 284 disposed in spaced apart relation along said flexible drive members.

Actuating lever 266a, arranged to close switch 266 when a tray 16 is positioned such that a receptacle 18 in said tray is positioned beneath the dispensing spout 14 on slide assembly 12.

Time delay relay 270 has an actuating arm 270a arranged to be closed by suitable camming means, such as spacer 284, for setting time delay relay 270 intermittently as the conveyor moves to a position aligning receptacle 18 in tray 16 beneath dispensing spout 14 of slide assembly 12.

OPERATION

The operation and function of the device hereinbefore described is as follows:

Referring to FIGS. VII–IX, movable wall 172 is adjusted to provide the desired volume of measuring compartment 165 corresponding to a desired weight or volume of material to be dispensed.

Storage vessel 4 is filled with particulate material and the spacing between edge 103 of plate 100 which extends across the outlet passage 98 of storage vessel 4 is set at a desired distance above conveyor belt 74.

Since container 10 is empty, switch 256 is closed energizing solenoid 235 to maintain valve 236 in the open position for delivering pressurized fluid to motor 120. When valve 236 is open motor 120 drives drive axle 62 of the first conveyor 6 causing belt 74 to rotate. Motor 120 also drives shaft 110 of agitator 108 in storage vessel 4 through belt 137.

Belt 75 of second conveyor 8 is driven by motor 120 through belt 141 and drive axle 62'.

Agitator 108 in storage vessel 4 agitates the particulate material disposed therein and a relatively dense sheet of particulate material is dispensed through the outlet passage of the storage vessel on belt 74 of the first conveyor 6.

Since the first conveyor 6 moves at a slower speed than the second conveyor 8, particulate material dispensed from the first conveyor 6 is spread into a less dense sheet on belt 75 of the second conveyor 8.

Particulate material is dispensed from the second conveyor 8 into container 10 until the level of particulate material engages arm 256b of switch 256 thereby breaking the circuit to solenoid 235 causing first conveyor 6, second conveyor 8 and agitator 108 to be de-energized.

When a tray 16 reaches the desired position wherein receptacle 18 is positioned immediately below dispensing spout 14 switch 266 and time delay relay 270 are closed energizing solenoid 233 to actuate valve 234. When valve 234 is actuated fluid pressure is delivered through conduit 292 to cylinder 186 causing elongated member 162 to move outwardly to position measuring compartment 165 over dispensing spout 14 causing the particulate material to fall into receptacle 18 and tray 16. After a predetermined period of time has passed, the time delay relay 270 breaks the electrical circuit causing valve 234 to return to its normal position wherein conduit 292 is vented and fluid pressure is directed through conduit 190 to cylinder 186 causing piston rod 188 to be retracted thereby moving elongated member 162 to the position illustrated in FIGS. I and VI of the drawing wherein measuring compartment 165 is positioned below the outlet passage 152 in container 10 for refilling.

Agitator motor 208 and vibrator 194 are constantly energized to agitate particulate material in container 10 and to shake the material toward the outlet passage 152 in a lower portion thereof.

It should be readily appreciated that the deformable support members 151 and vibrator 194 cause container 10 and slide assembly 12 to vibrate relative to the frame 2 of the measuring and dispensing device.

The particular sequence of events hereinbefore described allows moist particulate material to be dispensed in precisely regulated quantities. Agitator 108 in storage vessel 4 causes a relatively uniform sheet of material to be dispensed on the first conveyor 6. The speed differential between the first conveyor 6 and the second conveyor 8 further breaks down the particulate material which is dispensed into the container 10.

Switch 256 stops the conveyors 6 and 8 when a predetermined amount of particulate material is in container 10 to prevent compaction of material in the container.

Agitator 200 and vibrator 194 maintain the particulate material in a loose condition and urges the material into measuring compartment 165 and also from the measuring compartment 165 into receptacle 18.

When measuring compartment 165 is positioned over dispensing spout 14 the inclined walls 165a, b and c of the measuring compartment 165 formed in the polyethylene elongated member 162 in combination with the vibrating action imparted thereto by vibrator 194 causes substantially all of the moist particulate material in said measuring compartment to be dispensed into the receptacle 18 of tray 16.

From the foregoing it should be readily appreciated that switch 256 controlling movement of the first and second conveyors 6 and 8, respectively, maintains a substantially constant volume of particulate material in container 10.

Switch 266 and time delay relay 270 are arranged in series such that slide assembly 12 cannot be actuated to dispense material unless a tray 16 is present and properly positioned beneath dispensing spout 14.

While I have described a preferred embodiment of my invention it should be readily appreciated that other and further embodiments may be resorted to without departing from the general concept of my invention.

Having described my invention I claim:

1. Apparatus for measuring and dispensing particulate material comprising, a general frame; a container having an outlet passage in a lower portion thereof; means to place particulate material in the container; flexible support means between the container and the frame; an elongated member movable relative to the outlet passage in the lower portion of the container, said elongated member having a measuring compartment formed therein, said measuring compartment having a predetermined volume; downwardly diverging walls in said measuring compartment; means to move the elongated member between a first position wherein the outlet passage is closed and a second position wherein particulate material may pass through said outlet passage; and vibrator means associated with the container arranged to urge particulate material toward the outlet passage in the lower portion of the container.

2. The combination called for in claim 1 wherein the flexible support means comprises resilient elements connected between the frame and the container such that the container is free to vibrate relative to the frame.

3. The combination called for in claim 1 wherein the container has an inclined bottom to direct particulate material toward the outlet passage.

4. The combination called for in claim 1 with the addition of agitating means in the container to maintain the particulate material in a loose, uncompacted condition.

5. The combination called for in claim 4 wherein the agitating means comprises a shaft rotatably journaled in the container; protrusions on the shaft; and means for rotating the shaft.

6. The combination called for in claim 1 wherein the container has an opening in an upper portion thereof, and the means to place particulate material in the container comprises, a conveyor arranged to deposit material through the opening in the upper portion of the container.

7. The combination called for in claim 6 with the addition of means associated with the container to stop the conveyor when a predetermined quantity of particulate material is in the container.

8. The combination called for in claim 7 with the addition of a disengageable actuating means to drive the conveyor; and wherein the means to stop the conveyor when a predetermined quantity of particulate material is in the container comprises sensing means in the container arranged to disengage the actuating means when a predetermined quantity of material is in the container.

9. The combination called for in claim 6 with the addition of a storage vessel having an outlet passage in a lower portion thereof, said outlet passage in the storage vessel being arranged to deposit material on the conveyor.

10. The combination called for in claim 9 with the addition of means to vary the size of the outlet passage in the storage vessel.

11. The combination called for in claim 9 with the addition of means to prevent compaction of particulate material in the storage vessel.

12. The combination called for in claim 11 wherein the means to prevent compaction of particulate material in the storage vessel comprises, a shaft rotatably journaled in the storage vessel, protrusions on the shaft; and means to rotate the shaft.

13. The combination called for in claim 1 with the addition of means to vary the volume of the measuring compartment.

14. The combination called for in claim 1 with the addition of a movable wall in the measuring compartment; and means to move the wall to vary the volume of the measuring compartment.

15. The combination called for in claim 1 wherein the elongated member is constructed of plastic material.

16. Apparatus for measuring and dispensing particulate material comprising, a general frame; a container having an outlet passage in a lower portion thereof; a first conveyor movable relative to the frame; means for dispensing particulate material on the first conveyor; a second conveyor movable relative to the frame arranged to receive particulate material from the first conveyor and to dispense said particulate material into the container; drive means operably connected to the first conveyor; drive means operably connected to the second conveyor; flexible support means between the container and the frame; closure means movable relative to the outlet passage in the lower portion of the container; means to move the closure means between a first position wherein the outlet passage is closed and a second position wherein particulate material may pass through said outlet passage; and vibrator means associated with the container arranged to urge particulate material into the outlet passage in the lower portion of the container.

17. The combination called for in claim 16 wherein the second conveyor moves at a speed different from that of the first conveyor.

18. The combination called for in claim 16 wherein the second conveyor moves faster than the first conveyor.

19. Apparatus for measuring and dispensing particulate material comprising, a general frame; a container having an outlet passage in a lower portion thereof; means to place particulate material in the container; an elongated member movable relative to the outlet passage in the container said elongated member having a measuring compartment formed therein; downwardly diverging walls in the measuring compartment; means operably connected to the elongated member for moving the measuring compartment in said elongated member to a first position beneath the outlet passage in the container where particulate material is dispensed from the container into the measuring compartment, and a second position in spaced apart relation from the outlet passage in the container to cause material to be dispensed from the measuring compartment.

20. The combination called for in claim 19 wherein the elongated member is constructed of high density polyethylene.

21. The combination called for in claim 19 wherein the measuring compartment has at least one wall which is movable relative to the elongated member; and means to move the wall.

22. The combination called for in claim 19 with the addition of a vibrator operably connected to the container.

23. The combination called for in claim 19 with the addition of means in the container for maintaining the particulate material in a loose condition.

24. Apparatus for measuring and dispensing particulate material into receptacles comprising, a storage vessel having an outlet passage in a lower portion thereof; means to prevent compaction of material in said storage vessel; conveyor means movable adjacent said outlet passage to receive particulate material from said outlet passage; a container adjacent said conveyor for receiving particulate material dispensed therefrom; means to prevent compaction of particulate material in the container; means to prevent adhesion of the particulate material to the sides of the container; means to intermittently dispense quantities of particulate material from the container into receptacles; a movable conveyor arranged to carry the receptacles; and switching means associated with said conveyor carrying the receptacles, said switching means being arranged to cause material to be dispensed from the container only when a receptacle is in position to receive particulate material.

25. Apparatus for measuring and dispensing particulate material comprising, a general frame; a container having an outlet passage in a lower portion thereof; means to place particulate material in the container; flexible support means between the container and the frame; a tubular member having an inlet opening positioned adjacent the outlet passage in the container and having an outlet opening in spaced apart relation from said inlet opening; an elongated member slidably disposed in the tubular member; said elongated member having a measuring compartment formed therein; a fluid actuated cylinder having a piston movably disposed therein and a piston rod secured to the piston and to the elongated member to move the measuring compartment between positions adjacent the inlet opening and adjacent the outlet opening in the tubular member; a source of pressurized fluid alternately connectable to opposite sides of piston to move the elongated member; and vibrator means associated with the container arranged to urge particulate material toward the outlet passage in the lower portion of the container.

* * * * *